United States Patent Office 2,882,202
Patented Apr. 14, 1959

2,882,202

INSULIN CRYSTAL PREPARATIONS AND METHODS OF PRODUCING THEM

Karl Petersen, Copenhagen, and Jorgen Schlichtkrull and Knud Hallas-Möller, Holte, Denmark, assignors to Novo Terapeutisk Laboratorium A/S, Copenhagen, Denmark, a firm No Drawing. Application April 3, 1951
Serial No. 219,127

Claims priority, application Denmark April 5, 1950

16 Claims. (Cl. 167—75).

The present invention relates to insulin preparations having a protracted or prolonged action and effect and to processes for producing them.

The protracted or prolonged action and effect of the ordinary depot-creating insulin preparations is due to the presence or formation of solid insulin in a difficultly soluble condition at the pH of the blood. Heretofore, the insolubility of the insulin has been attained by means of compounds having a basic reaction such as protamine, globin and surfen (bis-2-methyl-4-aminochinolyl-6-carb-amide), which form compounds with the insulin which are difficultly soluble at neutral pH. These basic compounds are foreign to the human body and their introduction in the body is of questionable desirability. It has, however, been considered a fundamental principle in this art that to obtain insulin of protracted effect it was necessary to react the insulin with a basic substance.

Thus, it has heretofore been considered necessary, in the production of depot-creating insulin preparations to utilize processes which require the use of a special basic substance such as those mentioned. We have, however, found that it is possible to depart completely from these prior exclusively controlling principles and the methods based thereon, with the result that the use of these basic auxiliary substances, which complicates the production and clinical use of the desired insulin preparations is no longer necessary. It is, therefore, a principal object of the present invention to provide depot-creating insulin preparations of high quality and efficacy which are free from protamine, globin, surfen and like substances.

It is also an object of our invention to provide processes for producing the preparations of the character indicated.

Other objects and features of our invention will be readily apparent from the following detailed description thereof.

According to our invention we have found that insulin preparations of protracted effect can be obtained by using insulin in crystalline form in liquid suspension when the preparation contains a metal selected from the group consisting of zinc, cobalt, nickel, cadmium, copper, manganese and iron, which are prerequisite to the crystallization of insulin, in an amount per liter of the preparation above $7.5 \times A \times 10^{-3}$ milliequivalents, where "A" represents the number of international units of insulin per milliliter of the preparation. Of the metals specified, we prefer to use zinc, cobalt, nickel, or cadmium, or mixtures of these metals.

Fisher and Scott, Journal of Pharmacology, volume 58, pages 93 to 104 (1936) have, in connection with scientific investigations concerned the importance of the presence of zinc in protamine-insulin-preparations, produced a suspension of insulin crystals in distilled water, but they found by subcutaneous injections of rabbits with their suspensions of insulin crystals that the action of their preparation was not substantially different from the action of ordinary solutions of insulin which are known to have substantially no protracted action and make necessary frequent repeated injections.

The reason for the results obtained by Fisher and Scott is assumed to be that ordinary insulin crystals dissolve easily at the pH prevailing in the blood and the fluids of the tissues, viz. pH 7.2. Thus, if ordinary insulin crystals are suspended in distilled water and the suspension is then adjusted to pH 7, for example, with caustic soda, the crystals will dissolve completely, or at least substantially completely. Consequenty, suspensions of insulin crystals in distilled water have found no clinical use.

Biological and clinical experiments carried out by us have now shown, however, that it is possible by the use of insulin crystal suspensions produced in accordance with our invention to obtain by subcutaneous or intramuscular injection a degree of protracted action which fully corresponds to, and in many instances is substantially greater than that of the heretofore known insulin preparations.

Thus, we have found, for example, that a solution of crystalline insulin in a concentration of 40 international units per milliliter, to which have been added 4 milligrams of zinc (e.g. as chloride or other convenient form) per 100 milliliters does not exhibit any noticeable protracted effect. On the other hand, the same solution will exhibit a substantially protracted effect, which may extend over more than 24 hours, after the solution has been adjusted to pH 5 and allowed to stand, thereby causing crystallization of the precipitated insulin so that a crystal suspension is obtained. This example will serve to illustrate one of the aspects of our invention.

In order to obtain the results desired in accordance with one aspect of our invention, we prefer that the preparation contain at least $11 \times A \times 10^{-3}$ milliequivalents of the metal per liter. The metal content of our preparations may be derived from the insulin crystals employed and/or from the suspension medium employed. When using insulin crystals produced by heretofore known methods, for the production of our preparations it is preferred that the medium used for suspending the said crystals contain one or more of the above-specified metals in an amount exceeding $5 \times A \times 10^{-3}$, milliequivalents per liter. Better results will however be obtained when the suspension medium after the insulin crystals having been suspended therein, contains one or more of the specified metals in an amount above $5 \times A \times 10^{-3}$ milliequivalents per liter.

The reason for the readily noticeable protracted effect of the preparation produced in accordance with our invention has not been accounted for with certainty, but is presumably to be found in the combined fact that the insulin is present in crystalline state and that the crystals in the preparation are difficultly soluble at the pH of the blood. Thus, we have found that if known insulin crystals, for example commercial crystals containing 0.4% zinc, are suspended, for example, in an amount of 40 international units per milliliter in a zinc chloride solution which has been adjusted to a pH value of about 7 and which, for example, contains 0.008% of zinc, dissolved insulin will not be found in the suspension medium.

If the suspension medium of the preparations produced according to the invention has a pH value of approximately 7, or is adjusted to this pH value, we have made the surprising observation that the crystals show, upon analysis, an increased metal content, i.e. a metal content larger than that of the crystals originally suspended in the suspension medium.

The protracted effect of the preparations produced according to our invention may, therefore, also be accounted for by the presence or in situ formation of insulin crystals with increased metal content. Thus, we have found that the protracted effect aimed at may also be obtained by suspended in an aqueous medium which does not itself contain the metal carried by the crystals, previously prepared insulin crystals having a metal content above 0.16 milliequivalent per gram, preferably above 0.25 milliequivalent per gram, in an amount sufficient to bring the metal content of the entire preparation above $7.5 \times A \times 10^{-3}$ milliequivalents per liter, preferably above $11 \times A \times 10^{-3}$ milliequivalents per liter. However, even better results can be obtained by using insulin crystals having a metal content above 0.35 milliequivalent per gram of crystals.

Thus, in order to obtain the desired protracted effect, it is sufficient that the conditions in the suspension medium are such that crystals having an increased content of the particular metal employed are present at the pH value prevailing in the blood and the fluids of the tissues, i.e. pH 7.2.

It is, therefore, a further characteristic feature of our invention that a suspension medium for the suspended insulin crystals will have an increased metal content when the suspension medium has a pH of about 7.

Thus, when starting with insulin crystals prepared in accordance with known methods and containing, for example, about 0.4% zinc or an equivalent amount of other metals, the suspension medium of our preparation must have a metal content such that the suspended insulin crystals in the medium at pH 7 will have a metal content of over approximately 0.1 milliequivalent per gram of crystals.

However, in order to obtain a pronounced protracted effect with the preparations produced in accordance with our invention, we have found it advantageous to have present in the preparation, insulin crystals with a metal content of over approximately 0.2 milliequivalent per gram of the crystals. Thus, when zinc is the metal employed, the insulin crystals shall have a metal content of over about 0.65% zinc, when zinc has been used in the crystallization of the insulin. With a zinc content in the crystals of, for example, approximately 1%, the preparations of our invention will exhibit a protracted effect which is comparable to the protracted effect of the known protamine-zinc-insulin preparations. With increased zinc content it is possible to obtain an even greater protracted effect.

With regard to the metal content in the aqueous suspension medium it should first be noted that an increasing metal content in the suspension medium with increasing insulin content is required for forming insulin crystals with a predetermined increased metal content. This is provided for by the factor "A" in the previously mentioned formula. If, for example, the suspension medium thus contains 40 international units of insulin per milliliter, introduced in the form of insulin crystals having 0.4% zinc content, insulin crystals with a zinc content of approximately 2.3% will be obtained at pH 7 of the medium, adjusted by means of alkali hydroxide, when the suspension medium contains zinc in the amount of 0.008%, while crystals with a zinc content of about 2.6% will be obtained when the medium contains 10 international units of insulin per milliliter, and with an insulin content of 80 international units per milliliter, insulin crystals with a zinc content of about 1.8% will be obtained. With a predetermined amount of insulin crystals per unit of volume of suspension medium increasing metal content in the medium will produce increasing metal content in the crystals.

If the suspension medium has a pH value of about 7 or is adjusted to this pH value, under normal conditions up to about 2.7% may be bound, where zinc is the metal employed, which corresponds to the number of acid groups in the insulin molecule. Similar conditions apply to the other above-mentioned metals, i.e. cobalt, nickel, cadmium, copper, manganese and iron, the percentages varying, of course, in proportion to the equivalent weights of the respective metals.

Thus, provided that the suspension medium is not given a content of substances which have a greater affinity to the mentioned metals than the insulin crystals, as will be discussed in detail hereinafter, and provided that the insulin crystals have the normal metal content, e.g. 0.4% zinc content, each liter of the medium should preferably contain at least one of the metals, zinc, cobalt, nickel, cadmium, copper, manganese and iron in an amount corresponding to at least $5 \times A \times 10^{-3}$ milliequivalents, A denoting the number of international insulin units which have been added to the medium per milliliter.

With the insulin concentration of 40 international units per milliliter most frequently employed in practice, and a zinc-containing suspension medium containing 0.002%, and with insulin crystals with a zinc content of about 0.4%, the suspended insulin crystals when the suspension medium has a pH of 7 will contain about 1.1% zinc. When the suspension medium has a zinc content of 0.004%, the crystals will contain about 1.7% zinc, while a zinc content in the suspension medium of 0.008% will impart a zinc content of about 2.2% to the insulin crystals.

If it is desired that the suspended insulin crystals should be saturated with zinc, i.e. contain about 2.7% zinc, the suspension medium should, under the above-mentioned conditions, contain considerably more zinc, viz. about 0.03% at an insulin concentration of 40 international units per milliliter.

The pH value of the suspension medium is one of the factors which has a deciding influence on the solubility of the insulin crystals in the medium and on the increased metal content of the crystals. Provided that the medium does not contain substances, which have a specific ability to suppress the solubility of the crystals, as discussed below, it will not be possible with preparations for practical use to prevent all of the insulin crystals from dissolving when suspended in a medium with a pH value of above 9. Furthermore, above this pH value it will be difficult to produce preparations of a sufficient stability. Nor will it, under normal conditions, be possible to prevent the crystals from dissolving if the pH value of the suspension medium lies below 3–4. Consequently, if the suspension medium does not contain substances which have a quite specific ability of reducing the solubility of the insulin, it is necessary to keep the pH value of the medium within the limits 3–9.

As will appear from what is stated above, the suspension contains insulin crystals with increased metal content, when the suspension medium has a pH value of about 7, assuming that the medium does not contain substances which have a greater affinity to the metals employed than the insulin crystals. The increased metal content in the insulin crystal decreases as the pH is reduced and is not obtainable under normal conditions at pH 4–5 or below. Therefore, we preferably maintain the pH above 4–5.

It is not necessary, in order to obtain the desired protracted effect that the suspension in vitro contain insulin crystals with increased metal content so long as the preparation as a whole has a metal content of over $7.5 \times A \times 10^{-3}$ milliequivalents. It is sufficient that the increased metal content in the crystals be obtained by changing the pH value of the suspension to 7. For example, a change of the pH value to about 7 takes place by injection of such a suspension, whereby insulin crystals with increased metal content are presumably formed in vivo. Thus, clinical tests have shown that two otherwise identically composed suspensions of which one is adjusted to pH 4.5 and the other to pH 7, produce the same protracted effect. Analyses of the metal content of the suspended insulin crystals in the two suspensions show that insulin crystals in the suspension with pH 4.5 contain the original metal content, while crystals in the suspension with pH 7 contain an increased metal content.

Consequently, a further characteristic feature of the present invention is that the aqueous suspension may show an acid reaction or may be given such reaction.

Adjustment of the suspension medium to the desired pH value may, according to the invention, be effected by means of a buffer substance or a mixture of buffer substances, examples of which are set forth below.

In choosing a buffer substance or other material to be added to the aqueous suspension medium, another fact should be taken into consideration. Thus, it has been found that the presence of certain anions in the suspension medium influences the protracted effect of the insulin preparations, presumably on account of the influence of the anions on the solubility of the insulin crystals in the medium, as well as on the ability of the crystals to absorb metal from the suspension medium or to maintain an increased metal content. Thus, if for instance, ordinary insulin crystals containing, for example, 0.4% zinc, are suspended in an aqueous solution containing 0.008% zinc (as chloride, for example) and $\frac{1}{120}$ molar sodium phosphate and adjusted to pH 5, and the suspension medium is then adjusted to pH 7, it was found that the crystals dissolve completely or partly without binding zinc. The same would be the case if a citrate buffer were used instead of the phosphate buffer. However, if nickel is employed, instead of zinc, and a phosphate buffer is employed the crystals will not dissolve by changing pH to 7 but will take up nickel from the suspension medium.

It is presumed that the phosphate ions have greater affinity for the zinc ions than do the insulin crystals, and thus bind the zinc ions at neutral pH, while the phosphate ions are unable to bind the nickel ions in such a way that they are not available for the insulin crystals.

Therefore, if the greatest possible protracted effect of the produced suspensions is desired, and use is made of a buffer substance for adjustment of the pH value of the suspensions medium, a buffer substance should be employed, the anion of which does not bind the metal in question at neutral pH. This can, of course, be determined by simple routine tests.

On the other hand, advantage may be taken of partial solubility of the insulin crystals, as this makes it possible to produce insulin preparations which show, partly an initial insulin effect, partly a protracted effect. It will be possible, in accordance with the invention, to give the suspension medium such a composition and acidity that the medium contains or will contain insulin in dissolved or precipitated amorphous state. The presence of dissolved or precipitated amorphous insulin may be procured in advance or by allowing part of the insulin crystals to dissolve and to be precipitated in amorphous state, if desired.

It is in accordance herewith a further characteristic feature of the invention that a suspension medium may be employed which in advance contains dissolved or precipitated amorphous insulin, or that such a content is provided by means of the added insulin crystals.

The initial insulin effect may also be obtained by having added anions, which promote the solubility of the insulin crystals at neutral pH, to the suspension medium.

By varying the metal content of the suspension or the suspension medium, the pH value of the medium, its content of anions and its content of dissolved or precipitated amorphous insulin, it will thus be possible, according to the invention to provide insulin preparations which, while producing a protracted effect of a predetermined duration, also, to a predetermined degree, produce the same effect as insulin in dissolved state.

We have also found that the protracted effect of our suspensions of insulin crystals is influenced by the size of the suspended crystals. Biological tests performed on depancreatized dogs have shown that insulin crystals having a size of about $10\mu$ in zinc-containing suspension, and under comparable conditions, show a protracted effect which is of the same magnitude as that exhibited by protamine-zinc-insulin, while insulin crystals, in preparations made in accordance with the invention, having a size of $25-100\mu$ produce a still more protracted effect.

This fact is advantageously taken into consideration by employing crystalline insulin particles of a predetermined size. The desired size may be provided by a suitable regulation of the conditions of crystallization such as temperature, time of standing, agitation and like factors which affect crystal size and/or by grinding or crushing the crystals.

Insulin crystals produced by any method of crystallization whatsoever, which gives crystals of commercial utility, may be employed in producing our new insulin preparations. Among the hitherto known methods the so-called citrate method is preferred, as is described, for example, in the specification of Danish Patent No. 70,270. Other suitable methods include, for example, the method developed by Scott, Biochemical J. 28, 1592 (1934), and later methods derived therefrom.

For the production of a suspension medium showing a content of the above-specified metals, distilled water may per se be used with an addition of one or more of the metals, for example in the form of their salts. For clinical reasons it is, however, more advantageous to employ isotonic suspension media. Substances such as glucose, sodium chloride or glycerine may be employed to make aqueous media isotonic, in accordance with known practice. These substances are however only to be regarded as examples. Other examples will appear from the art in this field.

In order to insure stability of the insulin preparations it is advantageous to add one or more of the preserving agents usually employed for injection fluids. Examples of such preserving agents are phenol and phenol derivatives, methyl-p-hydroxybenzoate (nipagin), propyl-p-hydroxybenzoate and phenyl mercuric acetate.

The following specific examples are further illustrative of our invention.

*Example 1*

A suspension medium consisting of an isotonic solution to which a preserving agent, and one of the above-mentioned metals have been added, e.g. zinc has the following composition:

0.9% sodium chloride
0.1% nipagin
0.004% zinc (as chloride)

By adjustment of this suspension medium to a pH value between 6 and 7 ordinary insulin crystals will be even more difficultly soluble herein than in pure water, and crystals with an increased zinc content will be formed by suspension of the crystals herein. If the crystals prior to the suspension contain about 0.4% zinc, and they are added in such an amount that the suspension medium will contain 40 international units per milliliter, the suspended crystals will contain about 1.7% zinc.

When employing insulin crystals which are appreciably larger than $10\mu$, it is advantageous to add to the medium, a substance which increases the viscosity of the medium to such a degree that the crystals are kept suspended a suitable time after shaking of the ampule.

Examples of such substances, which are conveniently referred to as "suspension stabilizers," are high molecular polysaccharides, but the invention is not limited to the employment hereof. Also other known viscosity-increasing substances may be employed which, under the conditions of use, are inert to the insulin crystals and the other constituents of the suspension medium.

*Example 2*

A suspension medium consisting of an aqueous solution of an isotonic to which solution a preserving agent, one of the above-mentioned metals, e.g. nickel, and a suspension stabilizer have been added, has the following composition:

0.9% sodium chloride
0.2% tricresol
0.005% nickel (as chloride)
5% dextranum depolymerisatum The pH value is adjusted to 6–7 with caustic soda.

If insulin crystals are suspended herein, which do not contain nickel, in such an amount that the suspension medium will contain 40 international units per milliliter, the suspended crystals will contain nickel.

We have previously mentioned that the aqueous suspension medium may contain a buffer substance or a mixture of buffer substances, partly for regulation and maintenance of the pH value of the medium, partly for regulation of the initial effect of the preparation in vivo. As examples of suitable buffer substances may be mentioned acetate buffer, borate buffer, citrate buffer, diethyl barbiturate buffer, phosphate buffer, malate buffer or mixtures thereof. Of the mentioned buffers, phosphate and citrate buffer are advantageously employed for regulation of the initial effect of the preparations.

*Example 3*

A suspension medium consisting of an aqueous solution of an isotonic to which have been added a preserving agent, one of the above-mentioned metals, e.g. zinc, and a buffer substance for maintenance of the pH value of the medium, has the following composition:

0.8% sodium chloride
0.1% nipagin
0.008% zinc (as chloride)
1/20 molar sodium acetate The pH value is adjusted to about 5 with HCl.

Ordinary insulin crystals exhibit the same slight solubility in this suspension medium as in a suspension medium according to Example 1. If insulin crystals, which contain about 0.4% zinc, are suspended therein in such an amount that the suspension medium will contain 40 international units per milliliter, and if the pH value of the suspension medium is changed to 7, for example with NaOH, the suspended crystals will contain about 2.2% zinc.

*Example 4*

An aqueous suspension medium, which has the same acidity as the fluid of the tissues in the human body and is isotonic with the blood, has the following composition:

1.3 vol.-percent glycerine
0.1% nipagin
0.002% zinc (as chloride)
1/20 molar diethyl barbituric acid The pH value is adjusted to about 7.2 with NaOH.

Less than 2 international units of insulin per milliliter will go into solution in this suspension medium. If insulin crystals containing about 0.4% zinc are suspended therein in such an amount that the suspension medium will contain 40 international units per milliliter, the suspended crystals will contain about 1.1% zinc.

*Example 5*

An aqueous suspension medium with weak alkaline reaction has the following composition:

1.3 vol.-percent glycerine
0.1% nipagin
0.016% zinc (as chloride)
1/20 molar boric acid The pH value is adjusted to about 8 with NaOH.

In this suspension medium, as in the medium of Example 4, less than 2 international units of insulin per milliliter will go into solution. If insulin crystals containing about 0.4% zinc are suspended therein in such an amount that the suspension medium will contain 40 international units per milliliter, and if then the suspension medium is adjusted to pH 7, for example with HCl, the insulin crystals will contain about 2.5% zinc.

*Example 6*

There is produced an aqueous suspension medium containing 0.8% sodium chloride
0.1% nipagin
0.001% zinc (as chloride)
1/20 molar sodium acetate and the pH value is adjusted to 5 with HCl.

When insulin crystals with a zinc content of about 0.4% are suspended in this suspension medium in such an amount that the suspension medium contains 40 international units per milliliter, the suspended crystals will contain about 0.8% zinc, provided the suspension medium is adjusted to pH 7 with NaOH.

*Example 7*

There is produced an aqueous solution containing:

0.8% sodium chloride
0.1% nipagin
0.008% nickel (as chloride)
1/20 molar sodium phosphate and the solution is adjusted to pH 7 with HCl.

When insulin crystals with a nickel content of about 0.3% are suspended in this solution in such an amount that the suspension will contain 40 international units per milliliter, the suspended insulin crystals will exhibit an increased nickel content.

*Example 8*

1.3 vol.-percent glycerine
0.2% tricresol
0.014% cadmium (as chloride)
1/20 molar sodium acetate and the solution is adjusted to pH 5 with HCl.

When insulin crystals with a zinc content of about 0.4% are suspended therein in such an amount that the suspension will contain 40 international units per milliliter, the insulin crystals will prove to contain about 3% Cd, provided the pH-value of the suspension is changed to 7 with NaOH.

*Example 9*

There is produced an aqueous solution containing 0.8% sodium chloride
0.1% nipagin
0.006% copper (as chloride)
1/20 molar sodium acetate and the pH value is adjusted to 6 with HCl.

When insulin crystals with a zinc content of about 0.4% are suspended therein in such an amount that 40 international units per milliliter will be present in the suspension, the suspended insulin crystals will contain copper.

The suspension media for the insulin crystals in the above mentioned examples have such a composition that the crystals are practically insoluble in the media. The insulin preparations thus produced will in consequence first and foremost be distinguished by their protracted effect. However, preparations which partly produce a protracted effect, partly an initial insulin effect may also, as previously pointed out, be produced.

*Example 10*

There is produced a solution containing 1.3 vol.-percent glycerine
0.1% nipagin
0.008% zinc (as chloride)
1/20 molar sodium acetate and pH is adjusted to 4 with HCl.

When insulin crystals with a zinc content of about 0.4% are suspended therein in an amount of 40 international units per milliliter, ⅓ of the insulin crystals will go into solution, with the result that the suspension medium will contain 12–14 international units of dissolved insulin per milliliter. By subcutaneous or intramuscular injection of the resulting suspension, there will be obtained partly an initial effect due to the content of dissolved insulin, partly a protracted effect due to the content of the insulin crystals in suspended state.

Example 11

An aqueous solution acidified with hydrochloric acid is produced, which solution contains:

1.3 vol.-percent glycerine
0.1% nipagin
0.008% zinc (as chloride)
1/120 molar diethyl barbituric acid
0.087% insulin (23 international units per milligram) dissolved with HCl The pH of the solution is adjusted to about 7 with NaOH, whereby the dissolved insulin is precipitated quantitatively in amorphous condition (20 international units per milliliter). If insulin crystals are suspended in the resulting medium, an initial effect as well as a depot effect will be obtained by subcutaneous or intramuscular injection of the suspension.

In the above-mentioned examples the metals dealt with have been added in the form of their chlorides. However, they may also be added in the form of other inorganic or organic compounds, such as sulphates, nitrates, acetates, citrates, hydroxides, oxides or complex metal compounds. The metal itself may also be employed provided that under the conditions prevailing in the medium the metal may be taken up by the insulin crystals.

It should furthermore be noted that the change of the pH value after suspending the insulin crystals in the medium as mentioned in some of the examples, is only to be regarded as an analytic auxiliary. The suspension media are suitable for employment with the pH value to which they are adjusted when produced.

In the previous examples the insulin crystals have been produced separately by means of aseptic crystallization, and the crystals are then added to a ready made, sterile, aqueous suspension medium under aseptic conditions.

According to another embodiment of our invention, however, it is also possible to effect insulin crystallization in the suspension medium, for example as described in the following examples:

Example 12

174 milligrams of pure insulin are dissolved in 20 milliliters of 0.01 n hydrochloric acid, and in the indicated succession are added 20 milliliters of a 4% sodium chloride solution
10 milliliters of a 1/12 molar sodium acetate solution
50 milliliters of a solution containing 0.004% zinc
0.2% nipagin The pH value is then decreased to about 5 with hydrochloric acid, and the resulting suspension may be filled in an ampule. When allowed to stand the precipitated insulin becomes crystalline.

According to the invention the mother liquid of the insulin crystals may also be used as a suspension medium, the mother liquid being supplemented with any missing substances, such as isotonics, zinc or other of the above-mentioned metals, suspension stabilizers, and pH correcting substances.

Example 13

174 milligrams of crystalline insulin are dissolved in 20 milliliters of 0.01 n hydrochloric acid, whereupon 20 milliliters of a 4% sodium chloride solution and 10 milliliters of 1/12 molar sodium acetate solution are added.

The pH value of the solution is then adjusted to about 5.5 thereby causing the insulin to crystallize. When the crystallization has finished, 50 milliliters of a zinc chloride solution containing 0.016% zinc and 0.2% nipagin are added. The pH value of the resulting suspension is regulated afterwards, if necessary.

As will be apparent from the foregoing, according to the invention the metal may be added as well before as after suspending the insulin crystals in the medium. It is thus also possible to start from aseptic produced insulin crystals, which are suspended in an aqueous medium, to which the desired metal is later added.

Example 14

174 milligrams of insulin crystals are suspended in 50 milliliters of an aqueous suspension medium which contains 1.6% sodium chloride
0.2% nipagin
1/60 molar sodium acetate and is given a pH value of 5.5 by addition of HCl. To this suspension are added 50 milliliters of a zinc solution of the same acidity and containing 0.016% zinc. A zinc solution of another acidity than the suspension medium may also be employed, in which case the pH value of the final suspension may have to be regulated afterwards, if desired. If, for example, the insulin crystals originally contained about 0.4% zinc, by changing of the pH value of the suspension medium to 7 the suspended insulin crystals will contain about 2.2% zinc.

Likewise, the metal content of the suspension may completely or partly be provided by employment of insulin crystals, which in advance exhibit an increased metal content as compared with commercial insulin, for example, by employing insulin crystals produced by the method described in Examples 1, 4 and 5.

Example 15

There is produced a solution containing 1.3 vol.-percent glycerine
0.1% nipagin
1/120 molar sodium acetate and the pH value is adjusted to 5 by means of HCl.

When 1.7 grams of insulin crystals with a zinc content of about 2% are suspended in 1 liter of this aqueous medium, the crystals will remain undissolved, but part of the zinc will go into solution in the suspension medium with the result that it becomes zinc-containing.

In the above example the metal is added to the suspension medium through the crystals, that is, during the suspension. Addition of metal may also be effected by suspending crystals with a normal metal content while simultaneously adding desired metal.

The examples given above are only to be regarded as illustrative embodiments of the invention, the main characteristics of which consist in the provision of insulin crystal suspensions which exhibit a content of the specified metals, which is over $7.5 \times A \times 10^{-3}$ milliequivalents, as pointed out in the foregoing description.

It is therefore also within the scope of the invention to suspend insulin crystals with an increased content of one of the specified metals in a medium suitable for injection and not showing any content of the metals before the crystals have been suspended therein. As examples of such media may be mentioned distilled water and fatty oils, such as olive oil, sesame oil, and peanut oil.

It should finally be noted that the insulin preparations according to the invention may be brought on the market in two ampules one of which contains the suspension medium and the other the insulin crystals, which have previously been given an increased content of the specified metals, if desired.

It is thus another feature of our invention that we may produce insulin crystals of high metal content which may be suspended in a liquid medium, such as to provide an injectable preparation having a protracted or prolonged effect. As previously mentioned, the use of certain metals is necessary for the crystallization of insulin, and zinc has been employed commercially to form insulin crystals, the crystals having generally a zinc content of about 0.4%. Such crystals when suspended in water produce preparations having an action comparable to that of ordinary insulin solutions or amorphous insulin but there is no noticeable protracted effect.

In accordance with our invention, as will be apparent from the foregoing description, we can prepare insulin crystals having an increased metal content, i.e. a metal content greater than that heretofore obtained. These crystals of increased metal content, when suspended in water, provide the desired preparations of protracted action without the need of further treatment of the preparations except, when desired, the addition of isotonic media, preserving agents, buffers and the like. In accordance with the invention, as described above, we have prepared aqueous injectable compositions containing crystals of increased and high content of one or more of the metals, zinc, cobalt, nickel, cadmium, copper, manganese and iron. Thus, in the processes exemplified by Examples 1, 4 and 5, there are produced insulin crystals which may be separated from the aqueous medium to provide crystals of high metal content as described in Example 14. However, the crystals thus produced are formed in a manner which permits the final preparation containing them to be used for injection. When, however, it is desired merely to produce the crystals of high metal content without regard to the use of the aqueous medium, in which they are formed, for injection purposes, it is possible to vary somewhat the conditions hereinabove specified. For example, there may be a large excess in the metal content of the medium. Thus, it is possible to form the desired insulin crystals with increased metal content at a lower pH value than that mentioned in the foregoing description, i.e. pH 4–5, by increasing the metal content of the aqueous medium sufficiently. However, practical difficulties will be involved if the aqueous medium has a pH value below 2, since even if substances be present in the medium, which are able to suppress the solubility of the insulin crystals, it will be difficult to prevent the latter from going into solution.

Although our method of producing insulin crystals with increased metal content will be operative within a pH range of the aqueous medium between 2 and 9, the use of a pH value between 2 and 5 and between 8 and 9 will necessitate the presence of substances to a high degree suppressing the solubility of the insulin crystals, such as a content of the above-mentioned metals which is substantially above that required when operating between pH 5 to 8, and inorganic salts of the type used for salting out proteins, for example, sodium sulphate. In view thereof, the pH of the medium is preferably adjusted to between 5 and 8, and most advantageously it is adjusted to a pH between 6 and about 7. At pH between 6 and about 7 insulin crystals with increased metal content have been found to be most difficultly soluble. Moreover, a comparatively high metal content of the medium is required at lower pH values, and at pH values substantially above 7 there is often simultaneously effected a precipitation of metallic salts which must later be removed from the crystals if pure crystals are desired. As previously mentioned, adjustment of the aqueous medium to the desired pH value can be effected with the aid of buffer agents such as acetate buffer, borate buffer, citrate buffer, diethyl barbiturate buffer, phosphate buffer, malate buffer, or mixtures thereof.

As previously mentioned, in selecting the buffer and other substances to be added to the aqueous medium, care must be taken with respect to the introduction of anions which influence the binding of the metals used in the insulin crystals. If the aqueous medium contains phosphate or citrate, for example, by reason of the use of a phosphate buffer or a citrate buffer, and the medium is given a zinc content which would normally be sufficient to form insulin crystals with increased metal content, the insulin crystals at pH 5 will not take up zinc from the medium and the crystals will go into solution by adjusting the medium to pH 7. Thus, as previously mentioned, only when sufficiently large amounts of zinc are added so that after the phosphate and the citrate ions present have been bound by the zinc, there will be available zinc for the crystals, will the latter show an increased metal content. On the other hand, the presence of phosphate ions will, under the conditions above mentioned, not have an unfavorable influence on the formation of insulin crystals with increased nickel content. Whether or not the added ions will affect the process can readily be determined by simple routine experiment.

When, in accordance with the process, the crystals are added to the medium containing the metal, under normal conditions the crystals take up the metal rapidly and almost instantaneously. At any rate, there is no need for any particular waiting period before the crystals are separated from the suspension medium. We have found that allowing the crystal suspension to stand overnight will increase the metal content by at most 10% and that standing for another 24 hours will not produce any further increase. Thus, after the crystals have been suspended and the necessary pH adjustments made, as specified above, it is merely necessary to separate the crystals from the medium as by filtering or centrifuging.

As previously mentioned, the crystals with increased metal content produced according to our invention are valuable articles of commerce and can, for example, be suspended in injectable liquid media to form injectable preparations having a delayed or prolonged effect when injected subcutaneously or intramuscularly.

In carrying out our method, we may start from insulin crystals which already have a small metal content such as commercial insulin crystals containing about 0.4% zinc. The following examples illustrate this aspect of our invention.

*Example 16*

174 mgs. of crystalline insulin containing about 0.4% zinc are suspended in 100 mls. of an aqueous zinc chloride solution containing 0.008% zinc and adjusted to a pH value of about 7. The crystals are then separated as by filtering or centrifugation, and washed with water. The separated crystals show a zinc content of about 2.3%.

*Example 17*

43.5 mgs. of crystalline insulin with a zinc content of about 0.4% are suspended in 100 mls. of the zinc chloride solution used in Example 16 and the crystals are then separated and washed with water. The separated crystals show a zinc content of about 2.6%.

*Example 18*

348 mgs. of crystalline insulin with a zinc content of about 0.4% are suspended in 100 mls. of the zinc chloride solution used in Example 16 and the crystals are then separated and washed with water. The separated crystals show a zinc content of about 1.8%.

*Example 19*

174 mgs. of crystalline insulin with a zinc content of about 0.4% are suspended in 100 mls. of an aqueous nickel chloride solution containing 0.005% nickel and adjusted to pH 6–7 with sodium hydroxide. The crystals which are separated and washed contain nickel.

*Example 20*

174 mgs. of crystalline insulin with a zinc content of about 0.4% are suspended in 100 mls. of an aqueous solution containing 0.008% zinc (as sulphate) and 1/20 molar sodium acetate and adjusted to pH about 5 with HCl, whereafter the crystals are separated and washed with water. Insulin crystals with a zinc content of about 0.5% are obtained.

*Example 21*

The same procedure as in Example 20 is used except that the aqueous solution is adjusted to pH about 6. Thereby insulin crystals with a zinc content of about 1% are obtained.

*Example 22*

The same procedure as in Example 20 is used except that the aqueous solution is adjusted to pH about 7. Thereby insulin crystals with a zinc content of about 1.9% are obtained.

*Example 23*

174 mgs. of crystalline insulin are suspended in 100 mls. of an aqueous solution containing 0.002% zinc (as chloride) and 1/20 molar diethyl barbituric acid and adjusted to a pH value of about 7.2 with sodium hydroxide, whereafter the crystals are separated. They show a zinc content of about 1.1%.

*Example 24*

The same procedure as in Example 23 is used except that the aqueous solution is given a zinc content of 0.004%. Thereby crystals with a zinc content of about 1.7% are obtained.

*Example 25*

The same procedure as in Example 23 is used except that the aqueous solution is given a zinc content of 0.016%. Thereby crystals with a zinc content of about 2.5% are obtained.

*Example 26*

The same procedure as in Example 23 is used except that the aqueous solution is given a zinc content of about 0.03%. The separated crystals will then contain about 2.7% zinc.

*Example 27*

174 mgs. of crystalline insulin with a zinc content of about 0.4% are suspended in 100 mls. of an aqueous solution containing 0.016% zinc (as chloride) and 1/20 molar boric acid and adjusted to a pH value of about 7. The crystals are separated and washed with water. They contain about 2.5% zinc.

*Example 28*

174 mgs. of crystalline insulin with a nickel content of about 0.3% are suspended in 100 mls. of an aqueous solution containing 0.008% nickel (as chloride) and 1/20 molar sodium phosphate and adjusted to a pH value of about 7, whereafter the crystals are separated and washed with water. They show an increased nickel content.

*Example 29*

174 mgs. of crystalline insulin with a zinc content of about 0.4% are suspended in 100 mls. of an aqueous solution containing 0.014% cadmium (as chloride) and 1/20 molar sodium acetate and adjusted to pH about 7 whereafter the crystals are separated and washed with water. They show a cadmium content of about 3%.

*Example 30*

174 mgs. of crystalline insulin with a zinc content of about 0.4% are suspended in 100 mls. of an aqueous solution containing 0.006% copper (as chloride) and 1/20 molar sodium acetate and adjusted to pH about 6 with HCl, whereafter the crystals are separated and washed with water. The separated and washed crystals will show a content of copper.

In the foregoing examples previously produced insulin crystals having the usual metal content, e.g. insulin crystals containing about 0.4% zinc are used as starting material. However, our method may also be combined with crystallization of insulin using amorphous insulin as starting material or be combined with recrystallization of crystalline insulin. Thus, our invention contemplates the crystallization of insulin in an aqueous medium with subsequent addition of one or more of the metals, zinc, cobalt, nickel, cadmium, copper, manganese and iron, and/or adjustment of the pH value of the medium, thereby causing crystals with increased metal content to be formed.

Crystallization may be effected in accordance with the conventional crystallization methods by causing dissolved insulin to crystallize from an acidified aqueous solution containing one or more buffers, a crystallization promoting organic solvent such as acetone, propyl or butyl or amyl alcohol and a salt of one of the metals zinc, cobalt, nickel and cadmium, by changing the pH of the solution to between about 5 and about 6.5.

As previously mentioned, the buffers should be chosen with regard to their effect upon the metal present. Thus, when producing insulin crystals with increased zinc content it is not desirable to use phosphate or citrate buffer for the crystallization while on the other hand for the production of insulin crystals with increased nickel content, phosphate buffer, but not citrate buffer, may be used for the crystallization.

The following examples will serve to further illustrate our invention.

*Example 31*

200 mgs. of amorphous insulin (20 i.u. per mg.) are dissolved in 100 mls. of a hydrochloric solution containing 0.001% zinc (as chloride), 1/20 molar sodium acetate and 1/20 molar diethyl barbituric acid and the pH value of the solution is adjusted to 5.6–5.8 with NaOH. Upon standing, with stirring, if desired, the insulin crystallizes. When crystallization has finished 0.01% zinc (as chloride) is added and the pH value is then raised to about 7 with NaOH. The crystals are separated by suction and washed with water. They show a zinc content of about 2%.

*Example 32*

2.0 gs. of amorphous insulin (20 i.u. per mg.) are dissolved by means of hydrochloric acid in one liter of a solution containing 5% acetone, 0.001% zinc (as chloride), 1/20 molar sodium acetate and 1/20 molar diethyl barbituric acid and the pH value of the solution is then raised to about 5.8 with NaOH, thereby causing insulin to crystallize. When the crystallization has finished 200 mgs. of zinc (as chloride) are added and the pH value of the crystal suspension is raised to about 7 with NaOH. Then the crystals are separated and washed with water. They show a zinc content of about 2.5%.

*Example 33*

1.7 gs. of insulin crystals are dissolved by means of hydrochloric acid in one liter of a solution containing 1/20 molar sodium acetate and 1/20 molar diethyl barbituric acid and the pH value of the solution is then adjusted to 5.5–5.7 with NaOH. After standing with stirring, if desired, the insulin crystallizes. When the crystallization has finished 100 mgs. of zinc (as chloride) are added and the pH value is raised to about 7 with NaOH. After shaking the crystal suspension the crystals are separated and washed with water. They show a zinc content of about 2%.

*Example 34*

174 mgs. of crystalline insulin are dissolved in 20 mls. 0.01 N hydrochloric acid and in the indicated succession are added 10 mls. of a 1/2 molar sodium acetate solution
70 mls. of a solution containing 0.004% zinc (as chloride)

and the pH value is lowered to about 5. When the precipitated insulin has become crystalline by standing the pH value of the crystal suspension is adjusted to about 7, and the crystals are separated by suction and washed with water. They show a zinc content of about 1.4%.

As it will appear from the foregoing examples insulin crystals can be obtained by our method which have a widely varying metal content above the content which the crystals showed originally. By means of the crystals produced according to the invention it becomes possible to produce injectable crystal suspensions showing different delayed effect in accordance with the magnitude of the increased metal content of the crystals.

The insulin crystals produced according to the invention are generally characterized by having a metal content above 0.16 milliequivalent per gram of the crystals, preferably above 0.25 milliequivalent per gram of the crystals. It is particularly preferred to have a metal content of above 0.35 milligram per gram of crystals. They contain at least one of the metals zinc, cobalt, nickel, cadmium, copper, manganese and iron, preferably one or more of the four first mentioned metals.

What we claim and desire to secure by Letters Patent is:

1. An insulin crystal having bound with the insulin to form part of the insulin molecule at least one metal selected from the group consisting of zinc, cobalt, nickel, cadmium, copper, manganese and iron, in an amount of at least about 0.35 milliequivalent per gram, said insulin crystal being substantially insoluble in water at pH 7 and exhibiting a prolonged blood-sugar lowering action when suspended in water and injected parenterally.

2. An insulin crystal as defined in claim 1 wherein the metal is zinc and said zinc is present in an amount of from about 0.35 to about 0.9 milli-equivalent per gram.

3. An injectable insulin preparation for clinical use comprising a sterile injectable medium having sterile insulin crystals suspended therein, said suspended crystals containing per gram from about 0.35 to about 0.9 milliequivalent of at least one metal selected from the group consisting of zinc, cobalt, nickel, cadmium, copper, manganese and iron, said metals being bound with the insulin to form part of the insulin molecule and said crystals being substantially insoluble in water at pH 7 and exhibiting a prolonged blood-sugar lowering action when suspended in water and injected parenterally.

4. An injectable insulin preparation for clinical use as defined in claim 3, wherein the metal is zinc.

5. An injectable insulin preparation for clinical use comprising a sterile injectable aqueous medium having a pH-value within the range of at least pH 4.5 to about pH 8 and containing suspended therein sterile insulin crystals in the amount of about 20 to about 80 international units of insulin activity per milliliter of suspension, said medium and said crystals containing in total in non-toxic amounts at least about $20 \times A \times 10^{-3}$ milliequivalents per liter of at least one metal selected from the group consisting of zinc, cobalt, nickel, cadmium, copper, manganese and iron, A being the number of international units of insulin per milliliter of the preparation, the metal content of the suspended insulin crystals having a metal content of at least 0.35 milliequivalent per gram of crystals when the said preparation has a pH-value of about pH 7, said metal being bound with the insulin to form part of the insulin molecule and said crystals being substantially insoluble in water at pH 7 and exhibiting a prolonged blood-sugar lowering action when suspended in water and injected parenterally.

6. An injectable insulin preparation for clinical use as defined in claim 5, wherein the metal is zinc.

7. An injectable insulin preparation for clinical use comprising a sterile injectable aqueous medium having a pH-value of about pH 7 and containing sterile insulin crystals suspended therein, said medium and said crystals containing in non-toxic amounts at least $20 \times A \times 10^{-3}$ milliequivalents per liter of at least one metal selected from the group consisting of zinc, cobalt, nickel, cadmium, copper, manganese and iron, A being the number of international units of insulin per milliliter of the preparation, the suspended insulin crystals having a metal content of at least 0.35 milliequivalent per gram of crystals, said metal being bound with the insulin to form part of the insulin molecule and said crystals being substantially insoluble in water at pH 7 and exhibiting a prolonged blood-sugar lowering action when suspended in water and injected parenterally.

8. An injectable insulin preparation for clinical use comprising a sterile injectable aqueous medium having a pH-value within the range of about pH 6 to about pH 8, and containing sterile insulin crystals suspended therein, said medium and said crystals containing zinc at least in an amount of about $66 \times A \times 10^{-3}$ milliequivalents per liter, A being the number of international units of insulin per milliliter of the preparation, the suspended crystals having a zinc content above 0.35 milliequivalent per gram, said metal being bound with the insulin to form part of the insulin molecule and said crystals being substantially insoluble in water at pH 7 and exhibiting a prolonged blood-sugar lowering action when suspended in water and injected parenterally.

9. A process of making an injectable insulin preparation for clinical use which comprises crystallizing insulin under aseptic conditions from an aqueous insulin-containing solution having a pH-value between 5 and 6, said solution containing at least one metal selected from the group consisting of zinc, cobalt, nickel, cadmium, copper, manganese and iron in such amounts that the suspension of the insulin crystals produced contains at least one of the said metals in an non-toxic amount of at least $20 \times A \times 10^{-3}$ milliequivalents per liter, A being the number of international units of insulin per milliliter, and increasing the pH of the suspension to a value up to 8, whereby to form crystals with a metal content of at least about 0.35 milliequivalent per gram of crystals, said crystals being substantially insoluble in water at pH 7 and exhibiting a prolonged blood-sugar lowering action when suspended in water and injected parenterally.

10. A process of making an injectable insulin preparation for clinical use which comprises crystallizing insulin under aseptic conditions from an aqueous insulin-containing solution having a pH-value between 5 and 6, said solution containing at least one metal selected from the group consisting of zinc, cobalt, nickel, cadmium, copper, manganese and iron in amount sufficient to effect crystallization, and adding after said crystallization a sterile aqueous solution containing at least one of said metals in such amount that the mixture contains at least one of said metals in a non-toxic amount of at least $20 \times A \times 10^{-3}$ milliequivalents per liter, A being the number of international units of insulin per milliliter, and increasing the pH of the mixture to a value up to 8, whereby to form crystals with a metal content of at least about 0.35 milliequivalent per gram of crystals, said mixture being substantially free from buffer anions which have a greater affinity for the ions of the metal than does insulin and thereby bind the metal at the adjusted pH, said crystals being substantially insoluble in water at pH 7 and exhibiting a prolonged blood-sugar lowering action when suspended in water and injected parenterally.

11. The method of producing a prolonged insulin action in a human being which comprises administering parenterally an amount of a sterile composition comprising a suspension of insulin crystals in an aqueous medium, said medium and said crystals containing in non-toxic amounts at least $20 \times A \times 10^{-3}$ milliequivalents per liter of at least one metal of the group consisting of zinc, cobalt, nickel, cadmium, copper, manganese and iron, wherein A is the number of international units of insulin per milliliter of the composition, the said composition having a pH within the range of at least pH 4.5 to about pH 8, and the metal content of the crystals being at least about 0.35 milliequivalent per gram of crystals when the pH of the composition is about pH 7, said metal being bound with the insulin to form part of the insulin molecule and said crystals being substantially insoluble in said medium and said preparation exhibiting a prolonged blood-sugar lowering action when injected parenterally.

12. The method defined in claim 11 in which the insulin crystals in the suspension are zinc insulin crystals.

13. An injectable insulin preparation for clinical use as defined in claim 7, further comprising sterile amorphous insulin suspended therein.

14. An injectable insulin preparation for clinical use as defined in claim 13, wherein said metal is zinc.

15. An injectable insulin preparation for clinical use as defined in claim 3, further comprising sterile amorphous insulin suspended therein.

16. An injectable insulin preparation for clinical use as defined in claim 15, wherein said metal is zinc.

References Cited in the file of this patent

UNITED STATES PATENTS

| | | |
|---|---|---|
| 2,143,591 | Scott et al. | Jan. 10, 1939 |
| 2,174,862 | Sahyun | Oct. 3, 1939 |
| 2,354,211 | Lang | July 25, 1944 |

FOREIGN PATENTS

| | | |
|---|---|---|
| 508,983 | Great Britain | July 10, 1939 |
| 417,715 | Great Britain | Oct. 1, 1934 |

OTHER REFERENCES

Aubertin: Comptes Rendus Soc. de Biologie de Bordeaux (Paris), vol. 130, Annee 91, November 16, 1939, pp. 484–488.

Sahyun: Am. Jour. of Physiology, vol. 125, 1939, pp. 22–30.

Cohn: J. Am. Chem. Soc., vol. 63, January 1941, pp. 17–21.

Fisher: J. Pharmacol. and Exptl. Ther., vol. 58, September 1936, pp. 100 and 101.

Peck: The Procs. Am. Diab. Assn., vol. 2, 1942, pp. 72 and 73.

J.A.M.A., vol. 121, No. 8, February 20, 1943, p. 593.

UNITED STATES PATENT OFFICE
CERTIFICATE OF CORRECTION

Patent No. 2,882,202                                             April 14, 1959

Karl Petersen et al.

It is hereby certified that error appears in the printed specification of the above numbered patent requiring correction and that the said Letters Patent should read as corrected below.

Column 18, list of references cited, under the heading "OTHER REFERENCES" add the following:

Het Hormoon: Vol. 8, No. 10, June 1939,
           pp. 153-163 (pp. 158 and 160 relied
           upon).

Vogelenzang: Rec. des Trav. Chim., vol.
           58 (1939), pp. 201-206 (p. 203 relied
           upon).

Signed and sealed this 11th day of August 1959.

(SEAL)

Attest:

KARL H. AXLINE
Attesting Officer

ROBERT C. WATSON
Commissioner of Patents